(12) United States Patent
Klein

(10) Patent No.: US 6,289,962 B1
(45) Date of Patent: Sep. 18, 2001

(54) TIRE REMOVAL APPARATUS

(75) Inventor: Wilhelm Klein, Pfungstadt (DE)

(73) Assignee: Snap-on Deutschland Holding GmbH, Mettmann (DE)

( * ) Notice: Subject to any disclaimer, the term of this patent is extended or adjusted under 35 U.S.C. 154(b) by 0 days.

(21) Appl. No.: 09/572,986

(22) Filed: May 17, 2000

(30) Foreign Application Priority Data

May 17, 1999 (DE) ............................................. 199 22 584

(51) Int. Cl.[7] ................................................. B60C 25/132
(52) U.S. Cl. ............................................ 157/1.17; 157/1.24
(58) Field of Search ............................... 157/1.17, 1.24, 157/1.26, 1.28

(56) References Cited

U.S. PATENT DOCUMENTS

| | | | |
|---|---|---|---|
| 3,782,442 | * | 1/1974 | James .................................. 157/1.26 |
| 3,905,413 | * | 9/1975 | Myers .................................. 157/1.24 |
| 4,072,178 | * | 2/1978 | Du Quesne ........................ 157/1.17 |
| 4,884,611 | * | 12/1989 | Schmidt .......................... 157/1.17 X |

* cited by examiner

Primary Examiner—James G. Smith
(74) Attorney, Agent, or Firm—Shook, Hardy & Bacon L.L.P.

(57) ABSTRACT

An apparatus for pressing a pneumatic tire off a rim of a motor vehicle wheel comprises a pressing blade for removing the tire by pressing it off the rim. The pressing blade is mounted pivotably on a support structure of the machine in a substantially horizontal plane of pivotal movement. The apparatus includes a lift means for lifting the motor vehicle wheel in a standing position with its wheel axis into the horizontal plane of pivotal movement of the pressing blade.

6 Claims, 1 Drawing Sheet

TIRE REMOVAL APPARATUS

FIELD OF THE INVENTION

The invention concerns a tire removal apparatus and more specifically an apparatus for pressing a pneumatic tire off a rim of a motor vehicle wheel.

BACKGROUND OF THE INVENTION

A typical tire removal apparatus which operates by pressing a pneumatic tire off the rim of a motor vehicle wheel comprises a pressing blade which is mounted pivotably in a substantially horizontal plane of pivotal movement on a machine frame structure, in particular of a tire fitting and removing machine. The pressing blade is operable to release the pneumatic tire from the rim of the wheel before the tire is totally removed from the wheel. In that procedure, the tire is pressed over the hump of the rim. In such a machine the pressing blade is mounted to the machine frame structure pivotably horizontally in a fixed plane. As rims and pneumatic tires for motor vehicle wheels are of different sizes which are generally between 12 inches and 20 inches, that apparatus suffers from the disadvantage that it is only in rare cases that the pressing blade can be fitted accurately at the same level as the wheel axis. This means that the procedure for pressing the tire off the rim cannot be implemented in the optimum fashion, thereby entailing the risk of damaging the tire, for example by virtue of causing crushing deformation thereof, as well as the rim. Furthermore it is frequently necessary for the pressing blade to be applied to the tire a plurality of times, so that as a result the procedure for pressing the tire off the rim takes up a considerable amount of time.

SUMMARY OF THE INVENTION

An object of the present invention is to provide an apparatus for pressing a pneumatic tire off a motor vehicle wheel rim, which facilitates the procedure involved.

Another object of the present invention is to provide an apparatus for pressing a pneumatic tire off a motor vehicle wheel rim, which while being of a simple structure affords enhanced versatility of operation and operator-friendliness.

Still a further object of the present invention is to provide an apparatus for pressing a pneumatic tire off a motor vehicle wheel rim, which ensures enhanced accuracy of operation and thus more reliable operating results.

In accordance with the invention the foregoing and other objects are attained by an apparatus for pressing a pneumatic tire off the rim of a motor vehicle wheel, comprising a pressing blade mounted pivotably on a machine frame structure, in a substantially horizontal plane of pivotal movement. A lift means is operable to lift the motor vehicle wheel in an upright arrangement with its wheel axis into the plane of pivotal movement in which the tire-removal pressing region of the pressing blade is disposed.

In a preferred feature, the height at which the pressing blade is pivoted in the above-mentioned horizontal plane of pivotal movement with its pressing region which is substantially at the vertical center of the pressing blade, being therefore the level at which the pressing blade is mounted pivotably to the machine frame structure, at least approximately corresponds to the maximum radius of a motor vehicle wheel and is preferably at least approximately between about 50 and 60 cm above the floor surface on which the machine stands.

In another preferred feature the lift means has a wheel support plate which, particularly in the raised position of the lift means, can be locked in a working position so that the raised motor vehicle wheel can be rolled horizontally movably on the wheel support plate. That makes it possible to provide for accurate positioning of the motor vehicle wheel relative to the pressing blade in a horizontal direction, thereby avoiding damage to the wheel rim.

In a further preferred feature the lift means may further have rollers with substantially parallel roller axes, on which the motor vehicle wheel is mounted rotatably about its wheel axis in an upright arrangement on the lift means, when the wheel support plate is lowered. That arrangement provides that the motor vehicle wheel can be turned into the desired position about its wheel axis, for the operation of pressing the tire off the wheel rim.

The lift height can be limited by a setting means which can be pre-adjusted in dependence on the wheel diameter and which can be electrical or mechanical in operation. The pre-settable setting means is also set to the height at which the pressing region of the pressing blade is movable in the horizontal plane over the floor surface. For that purpose, the setting means, which can be of a mechanical nature, can have a scale in a vertical direction, along which a mechanical abutment is displaceable in dependence on the wheel diameter. The vertical scale is calibrated or preset to the height of the plane in which the pressing region of the pressing blade, in particular at the center thereof, is supported pivotably on the machine frame structure.

The setting means may also operate electrically, in which case the height of the horizontal plane of the pressing region of the pressing blade and the respective diameter of the motor vehicle wheel are taken into consideration. The drive for the lift means is then controlled in dependence on the electrical setting means.

Further objects, features and advantages of the invention will be apparent from the description hereinafter of a preferred embodiment.

DESCRIPTION OF THE PREFERRED EMBODIMENT

Figure 1:
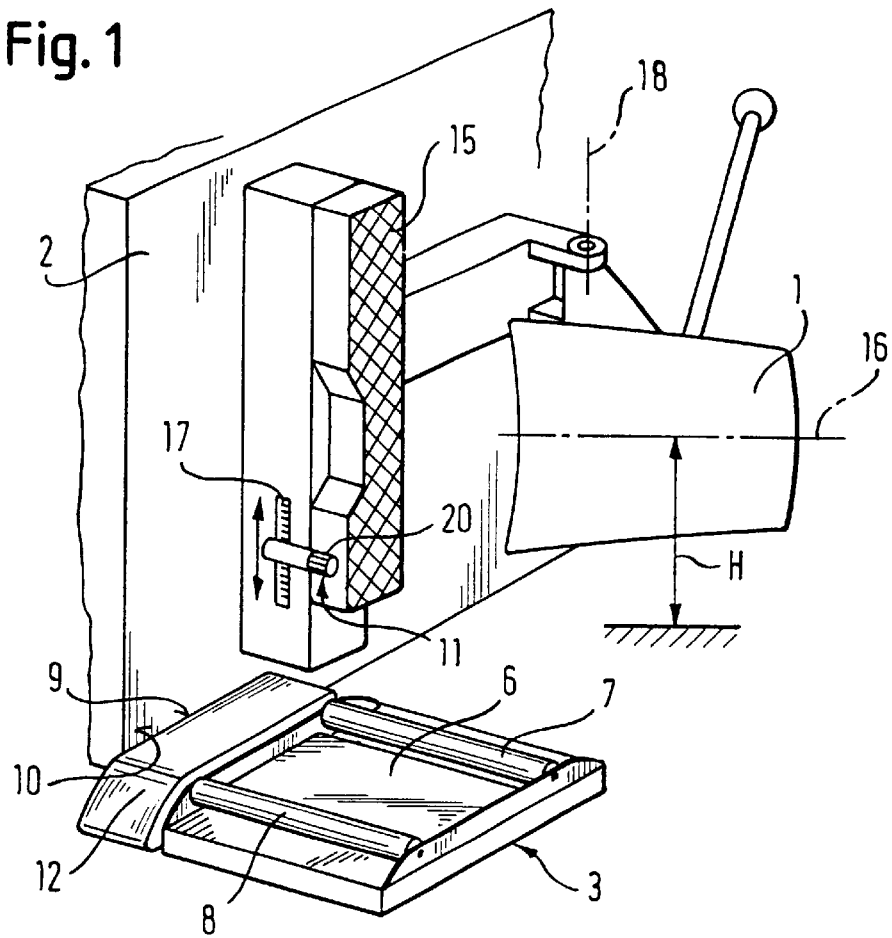
FIG. 1 is a perspective view of a part of a machine frame structure of a tire fitting machine with associated lift means.

Referring now generally to the drawing, the apparatus for pressing a pneumatic tire off a rim of a motor vehicle wheel as generally indicated at 4 comprises a pressing blade 1 for engaging the tire to press it off the wheel rim. The pressing blade 1 is laterally supported pivotably about a pivot axis 18 on a machine support structure 2, for example of a tire fitting machine. The pressing blade 1 is pivotable about the pivot axis 18 in a substantially horizontal plane and can thereby be pressed against the side wall of a pneumatic tire 19 of the motor vehicle wheel 4.

Figure 2:
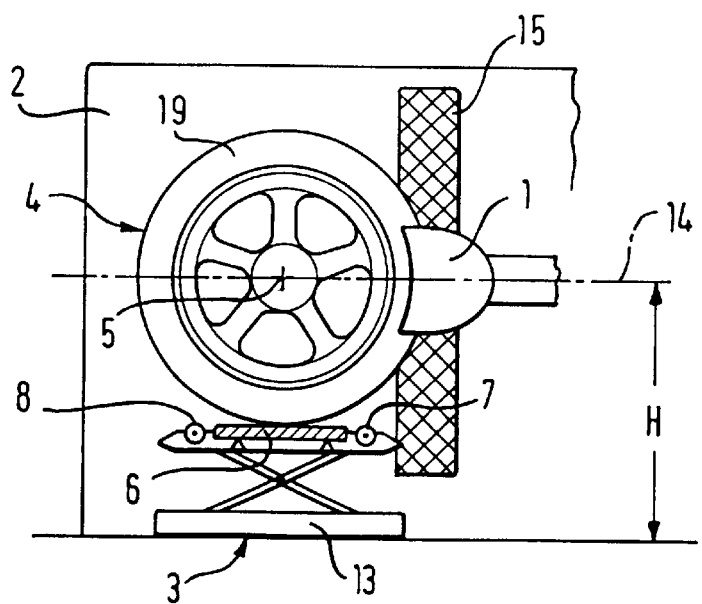
FIG. 2 is a side view of the lift means with a lifted motor vehicle wheel.

In order to ensure that the pressing blade 1 is pressed, in particular with its tire-removal pressing region in the proximity of its horizontal center line 16, against the side wall of the wheel 4 at the height of the wheel axis 5 of the wheel 4, in such a way as to avoid damaging the wheel rim and the tire, the apparatus has a lift means which is diagrammatically indicated at 3. The lift means 3 can be a component part of the tire fitting machine. It is also possible however for the lift means 3 to be in the form of an accessory unit for the tire fitting machine. The lift means 3 for raising the motor vehicle wheel is disposed in the proximity of a pressure shoe 15 which is secured to the machine support structure 2, as shown in FIGS. 1 and 2. The pressure shoe 15 forms a support for the wheel and the tire in the procedure for pressing the tire off the rim by means of the pressing region of the pressing blade 1.

In order to ensure that the lift means 3 is arranged in the right position relative to the pressure shoe 15 and the region of pivotal movement of the pressing blade 1, the lift means 3 can be provided with an abutment surface 9 which is such that it can be brought to bear against a surface 10 on the machine support structure 2. It is also possible to provide a plurality of abutment surfaces 9 on the machine support structure 2 for arranging the lift means in the appropriate position.

The lift means 3 has a wheel support plate 6 arranged between a pair of rollers 7 and 8 which have at least substantially mutually parallel roller axes. The wheel 4 is put in a standing or upright condition on to the rollers 7 and 8, with the lift means 3 in the lowered position. In that case, the wheel support plate is in a lowered position as illustrated in FIG. 1. The wheel 4 can then be rotated about its wheel axis 5 in an upright position on the rollers 7 and 8.

The wheel 4 is raised by the lift means 3 to such an extent that its wheel axis 5 passes into a horizontal plane as indicated at 14 in FIG. 2, being the plane in which the pressing region for example at the horizontal center line 16 of the pressing blade 1 is disposed. As shown in FIG. 2, the plane 14 is at a fixed height H above the floor surface on which the machine stands and on which the lift means 3 rests. The height H is such that it corresponds to the maximum radius of a motor vehicle wheel. It is for example between 50 and 60 cm.

In the raised position of the lift means 3 as shown in FIG. 2, the wheel support plate 6 has also been moved into a raised position and locked in that position. For that purpose, a lifting mechanism for the wheel support plate 6 can be provided on the liftable part of the lift means 3. The wheel 4 can then roll in a horizontal direction on the wheel support plate 6 and can be moved thereon and can be put into such a position that the edge of the rim is not adversely affected in the procedure for pressing the tire off the rim. The motor vehicle wheel 4 can thus be moved into the optimum position for the tire removal procedure.

In order to make it easier for the wheel 4, to be lifted into the correct appropriate position, a mechanical setting means as indicated at 11 in FIG. 1 can be provided on the machine support structure 2. The setting means 11 can include a scale 17 on which various wheel diameters for differing motor vehicle wheels 4 are indicated in scalar form. The various heightwise settings for the differing wheel diameters on the vertically extending scale 17 are related to the height H of the horizontal plane 14 in which the pressing region of the pressing blade 1 around the horizontal central line 16 of the pressing blade 1 is movable, in relation to the floor surface. A mechanical abutment 20 of the setting means 11 can be displaceable along the scale 17 in dependence on the respective wheel diameter. The lifting movement of the lift means 3 then takes place up to the mechanical abutment 20. The lifting movement can be implemented manually or by means of a suitable drive arrangement as diagrammatically indicated at 13 in FIG. 2. The drive arrangement 13 can be in the form of an electrical, pneumatic or hydraulic drive arrangement. For that purpose, there may be an electrical control device as indicated at 12 in FIG. 1, into which the relevant wheel diameter is inputted. The electrical control device 12 also includes a memory for storing the fixed value in respect of the height H for the horizontal plane 14. The lifting movement of the lift means 3 is then stopped at the correct heightwise position in dependence on the specified wheel diameter. The drive arrangement 13 is suitably actuated for that purpose. The diameters of the respective vehicle wheels to be processed can also be taken from a database, in which case the apparatus can be integrated into a network which includes still other service units such as balancing machines, tire testing machines and the like.

It will be appreciated that the above-described embodiment of the invention has been set forth solely by way of example and illustration of the principles thereof and that various other modifications and alterations may be made therein without thereby departing from the spirit and scope of the invention.

What is claimed is:

1. Apparatus for pressing a pneumatic tire off a rim of a motor vehicle wheel, comprising a support structure, a pressing blade including a pressing region adapted to remove a tire iron from a rim by pressing against the tire, means mounting the pressing blade pivotably on the support structure in a substantially horizontal plane of pivotal movement, a lift means operable to lift the motor vehicle wheel in an upright arrangement with its wheel axis into said plane of pivotal movement in which the tire-removal pressing region of the pressing blade is disposed, a setting means for limiting the lift height, and means for pre-setting said setting means in dependence on wheel diameter.

2. Apparatus as set forth in claim 1 wherein the height at which the plane of pivotal movement of the pressing blade is disposed at least approximately corresponds to the maximum radius of a motor vehicle wheel.

3. Apparatus as set forth in claim 2 wherein said height is between 50 and 60 cm.

4. Apparatus as set forth in claim 1 wherein said lift means has a wheel support plate on which a raised motor vehicle wheel can be horizontally movably rolled.

5. Apparatus as set forth in claim 4 wherein said lift means has rollers having substantially parallel roller axes, on which said motor vehicle wheel is mounted rotatably about its wheel axis when the wheel support plate is lowered.

6. Apparatus as set forth in claim 1 wherein said lift means has an abutment surface adapted to be borne against a surface provided on said support structure for arranging the lift means in the appropriate position.

* * * * *